Oct. 18, 1966   A. WINKLER ETAL   3,279,344
CAMERA STRUCTURE FOR CONTROLLING FILM ADVANCE, FOR PREVENTING
DOUBLE EXPOSURES, AND FOR COUNTING EXPOSURES
Filed Oct. 12, 1964
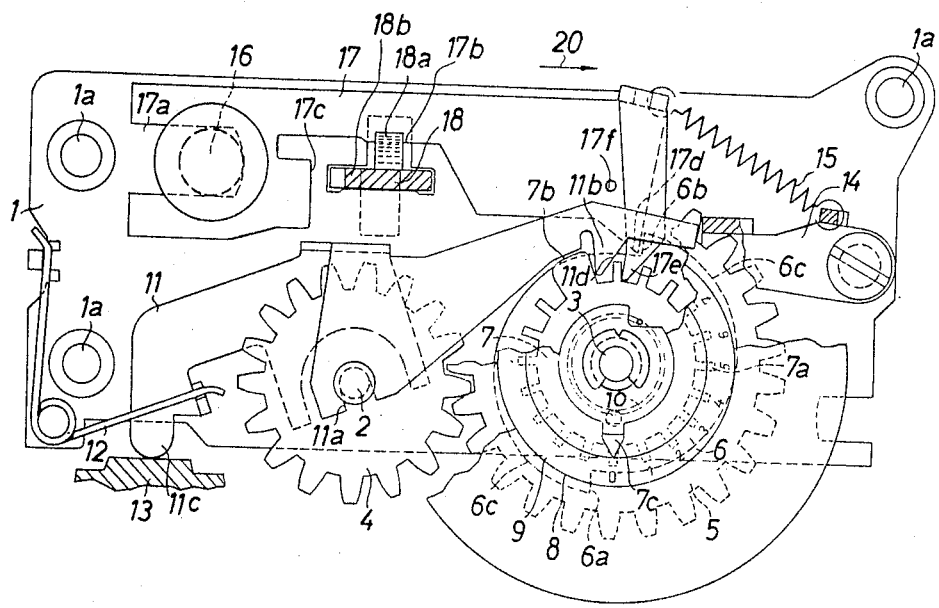
INVENTOR.
ALFRED WINKLER
BY DIETER ENGELSMANN
KURT ZATTLER
Michael J Striker United States Patent Office 3,279,344
Patented Oct. 18, 1966

3,279,344
CAMERA STRUCTURE FOR CONTROLLING FILM ADVANCE, FOR PREVENTING DOUBLE EXPOSURES, AND FOR COUNTING EXPOSURES
Alfred Winkler, Munich, Dieter Engelsmann, Unterhaching, and Kurt Zattler, Munich, Germany, assignors to Agfa Aktiengesellschaft, Leverkusen, Germany
Filed Oct. 12, 1964, Ser. No. 402,994
Claims priority, application Germany, Oct. 12, 1963,
A 20,727
9 Claims. (Cl. 95—31)

The present invention relates to cameras.

More particularly, the present invention relates to cameras which have a structure for preventing double exposures and for counting the number of exposures as well as for cooperating with the film transporting structure to limit the extent to which film is transported.

Cameras of this general type are well known.

One of the primary objects of the present invention is to provide for a camera of the above type a structure which will prevent further operation of the shutter release of the camera as well as further operation of the exposure counting structure thereof, after the last frame on the film has been exposed, while permitting at this time unrestrained further transportation of the film into the cartridge which receives the exposed film, for example, so that in this way whatever film remains after the last exposure has been made can be transported together with the last film frame into the film-receiving cartridge in preparation for removal of the latter from the camera.

Furthermore, it is an object of the present invention to provide an exceedingly simple exposure counting structure which is automatically zeroed when the camera is opened in order to remove exposed film and place unexposed film in the camera.

Furthermore, it is an object of the present invention to provide an exceedingly simple, compact, and reliable structure for preventing double exposures, for actuating an exposure counter, and for limiting the extent to which film is transported after each exposure.

With these objects in view the invention includes, in a camera, a shutter release means for releasing the camera shutter so as to make an exposure, an exposure counting means for counting the number of exposures, and a film transporting means for transporting film in the camera. In accordance with the present invention a movable means cooperates with the shutter release means to prevent the latter from being actuated a second time after it has been actuated once to expose a given film frame, until a new unexposed film frame has been situated in a position to be exposed, and this movable means also cooperates with the exposure counting means for actuating the latter to count the exposures as well as with the film transporting means to limit the latter to transportation of the film by a distance equal to a single film frame after each exposure. The film transporting means includes a rotary cam and the exposure counting means includes a rotary gear, while the movable means has a pair of projections one of which cooperates with this cam and the other of which extends into the teeth of the rotary gear. One of the teeth of this gear, in accordance with the present invention, is wider than and extends outwardly beyond the remaining teeth of this gear.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible embodiment of a structure according to the present invention is shown in a top plan view, which is partly in section.

Referring now to the drawing, a camera housing, which is not illustrated for the sake of clarity, carries a plurality of supporting posts 1a which serve to support a plate 1 which carries the structure of the invention, this plate 1 having the configuration illustrated in the drawing. The supporting plate 1 carries a pair of pins 2 and 3 on which gears 4 and 5 are respectively mounted for rotary movement. The gear 4 is connected in an unillustrated manner with a film transporting structure which together with the gear 4 forms a film transporting means, and this structure which is connected to the gear 4 may take the form of a rotary member having projections adapted to enter into the film perforations for advancing the film when the gear 4 rotates, as is well known in the art. The gear 4 meshes with gear 5, and the gear 5 is coaxially fixed with a cam 6 which forms together with the gears 4 and 5 and the unillustrated structure referred to above the film transporting means, this cam 6 having a pair of diametrically opposed camming shoulders 6a and 6b, and having camming edges 6c extending from these shoulders, as indicated in the drawing. The pin 3, in addition to supporting the gear 5 and the cam 6 which is fixed thereto for rotary movement also supports for rotary movement a gear 7 which forms part of the exposure counting means of the camera, this counting gear 7 having teeth 7a and one tooth 7b which determines, in a manner described below, the initial position of the exposure counting means, this tooth 7b being wider than and extending outwardly beyond the remaining teeth 7a of the gear 7. As may be seen from the drawing, the several gear teeth 7a are separated from each other by gaps of uniform width, and the width of the tooth 7b is greater than the uniform width of the gaps between the teeth 7a. The gear 7 carries a pointer 7c which is visible in an exposure counter window 8 and which turns together with the gear 7 with respect to a stationary exposure counting scale 9 so that the position of the pointer 7c along the scale 9 will indicate the number of exposures which have been made. A spring means 10 is operatively connected with the gear 7 to be tensioned during the exposure counting operations so that in a manner described below the spring means 10 when released is capable of returning the counter to a zero or initial position.

Various control members are carried by the plate 1. One of these members is in the form of a two-arm lever 11 which forms a holding pawl cooperating with the gear 7 for preventing return movement thereof by the spring 10 during the exposure counting operations. This holding pawl 11 has spaced upper and lower portions between which the gear 4 extends, and these upper and lower wall portions of the lever 11 are provided with notches 11a receiving the pin 2 so that in this way the pin 2 forms a pivot axis for the lever 11. As is apparent from the lower left portion of the drawing, an end 11c, which is curved, engages the door 13 of the camera, and the notches 11a while cooperating with the pin 2 in order to form a pivot axis for the lever 11 at the same time do not prevent rocking of the lever 11 by turning thereof at its end 11c on the surface of the camera door 13 which is engaged by the end 11c of the lever 11. The plate 1 supports a spring 12 which engages the lever 11 to urge the latter to turn in a counterclockwise direction, as viewed in the drawing, about the pin 2, and it will be noted that the spring 12 maintains the end 11c of the lever 11 against the inner surface of the rear door 13 of the camera. The holding pawl 11 has a pawl tooth 11b extending into the teeth of the gear 7, and when the door 13 is displaced to a position opening the camera, it no longer engages the end 11c of the lever 11 so that the spring 12 can now turn the lever 11 in a direction displacing the tooth 11b of the holding pawl away from the teeth of the gear 7. In this way the gear 7 is released to the force of the spring 10 which now can return the gear 7 to its initial position in order to zero the exposure counter, and in this position the wider tooth 7b engages the tooth 11b of the pawl 11. When the gear 7 is returned by the spring 10 to its initial position this gear 7 turns in a clockwise direction, as viewed in the drawing, whereas during the counting of the exposures the gear 7 is stepped about its axis in a counterclockwise direction, in a manner described below.

When the door 13 is returned to its position closing the camera housing, then this door 13 engages the end 11c of the holding pawl 11 to turn the latter in a clockwise direction, as viewed in the drawing, about the pin 2, so that the pawl tooth 11b enters into a space between a pair of teeth of the gear 7. During the advance of the counting gear in a counterclockwise direction, as viewed in the drawing, each tooth thereof will ride along the inclined tooth edge 11d so as to displace the pawl 11 while rocking it about its end 11c until the tooth 11d snaps into the next space between the teeth of the gear 7. In this way the holding pawl 11 operates to prevent return of the gear 7 by the spring 10 as long as the door 13 remains in its closed position.

The plate 1 also carries a pin on which a lever 14 is supported for swinging movement, this lever 14 being urged by the spring 15 in a counterclockwise direction, as viewed in the drawing, and at its left end, as viewed in the drawing, the lever 14 fixedly carries a tooth-engaging portion which engages a tooth of the gear 5 so as to limit the latter to counterclockwise rotation only, the gear 5 being incapable of turning in a clockwise direction, as viewed in the drawing, because of the engagement of the lever 14 with the teeth of the gear 5 as illustrated in the drawing.

Finally, the structure includes a movable means 17 in the form of an elongated member acting both as a slide member capable of sliding longitudinally along the plate 1 as well as a lever capable of turning about the pivot 16. This pivot 16 is carried by the plate 1 and is in the form of a pin having an enlarged head end situated over the member 17, the shank of the pin 16 being received in an elongated notch 17a and engaging the member 17 at the right end of the notch 17a, as viewed in the drawing, so that in this way movement of the movable means 17 to the left, as viewed in the drawing, is limited by the pin 16 which also serves to guide the member 17 for pivotal movement about the axis of the pin 16. The spring 15 which is connected to the lever 14 so as to urge the latter in a counterclockwise direction, as viewed in the drawing, is also connected to the movable means 17 for urging the latter in the direction of the arrow 20, so that the spring 15 is supported between and connected to the members 14 and 17. The slide member 17 has a pair of edge portions 17b and 17c which are adapted to cooperate with the shutter release means 18, and in addition the movable means 17 has a pair of control projections 17d and 17e. At its right end, as viewed in the drawing, the movable means 17 is composed of a pair of plates located against and fixed rigidly to each other, and the upper plate is connected to the spring 15 and forms at its free end the projection 17e, while the lower plate which forms an integral part of the remainder of the movable means 17 is provided with the projection 17d. The shutter release plunger 18 fixedly carries a camming projection 18a which is of wedge-shaped configuration and which has an inclined camming surface extending downwardly from the top of the projection 18a and also extending rearwardly from the top of the projection 18a, so that the inclined camming edge of projection 18a is inclined downwardly and rearwardly from the top toward the bottom of this inclined camming edge, the upper part of the projection 18a as viewed in the drawing being the front end thereof and the lower part thereof as viewed in the drawing being the rear end thereof. In addition the shutter release means 18 has a lateral projection 18b extending to the left, as viewed in the drawing.

The above-described structure operates in the following manner:

When the shutter release means 18 is depressed in a vertically downward direction, the inclined camming surface of the cam 18a engages the edge 17b of the movable means 17 for turning the latter about the pin 16 in a counterclockwise direction, as viewed in the drawing, in opposition to the spring 15. As a result, the projection 17d, which is situated in front of the shoulder 6b in the position of the parts shown in the drawing, is displaced away from the shoulder 6b, and at the same time the projection 17e is displaced out of the space between the teeth of the gear 7. As soon as the projections 17d and 17e have been displaced in a counterclockwise direction beyond the cam 6 and the gear 7, the spring 15 pulls the member 17 in the direction of the arrow 20, so that now the projection 17d engages the camming edge 6c which extends from the shoulder 6b to the right, as viewed in the drawing. An additional result of this displacement of the movable means 17 in the direction of the arrow 20 is that the edge 17c of the movable means 17 engages the shutter release means 18 and when the latter is released after having tripped the shutter to make an exposure, the shutter release means 18 returns upwardly, under the influence of an unillustrated spring, to its initial elevation, and the movement of the member 17 by the spring 15 in the direction of the arrow 20 situates the edge 17c beneath the lateral projection 18b so that the operator cannot again depress the shuter release means 18 as long as the member 17 remains in its position displaced to the right from the position thereof shown in the drawing, and in this way the movable means 17 cooperates with the shutter release means to prevent a double exposure. Of course, the displacement of the member 17 in the direction of the arrow 20 has also displaced the projection 17e with respect to the teeth of the gear 7 so that this projection 17e cannot again enter into the space in front of the same tooth of the gear 7 in front of which this projection 17e was previously located.

After the exposure is made the operator will turn a lever which is connected through a suitable transmission to the gear 5 so as to turn the latter in a counterclockwise dirtcion, as viewed in the drawing, in order to advance the film, and the turning of the gear 5 will be transmitted to the gear 4 in order to actuate the film transporting means. The cam 6 of course turns with the gear 5, and as the camming edge 6c moves along the projection 17d the member 17 gradually turns in a clockwise direction, under the influence of the spring 15, until finally the next shoulder 6a of the cam 6 engages the projection 17d and at the same time the projection 17e enters into the next gap of the gear 7 which is displaced in clockwise direction from the gap which was previously occupied by the projection 17e. During the final part of the film transporting cycle the camming shoulder 6a will not only engage the projection 17d, it will in addition displace the movable means 17 to the left, as viewed in the drawing, back to the position thereof shown in the drawing, and this displacement is limited by engagement of the member 17 at the right end of its notch 17a with the shank of the pin 16, as was pointed out above. As a result the edge 17c moves away from its location beneath the projection 18b, so that the shutter release means 18 can now be actuated to make the next exposure, and furthermore the projection 17e turns the gear 7 through a distance of one tooth 7a, so that the previously made exposure has now been counted. Furthermore, the limiting of the rotary movement of the cam 6 by engagement of the member 17 with the pin 16 at the right end of the notch 17a limits the film transporting means to an operation which will displace the film by a distance equal to only one film frame. It is to be noted that when the movement of the member 17 to the left is limited by the pin 16 the lever 14 has just snapped behind one of the teeth of the gear 5, so that the cam 6 cannot turn in either direction from its end position and in this way the film is very reliably transported by a predetermined piston which is equal to the dimension of one film frame longitudinally along the film strip. The turning of the gear 7 simultaneously with the displacement of the member 17 to the left tensions the spring 10 further. Moreover, in the manner described above, one of the teeth 7a rides along the inclined edge 11d of the pawl tooth 11b so as to displace the tooth 11d of the holding pawl 11 into the next gap at the gear 7, and in this way when the projection 17e is again displaced out of the teeth of the gear 7 this gear 7 will be prevented from turning in a clockwise direction by the holding pawl 11. Now the operator can again actuate the shutter release means 18, and the above-described operations will be repeated.

As is apparent from the above description, as the successive exposures are made the counter gear 7 will be advanced in a stepwise manner in a counterclockwise direction, as viewed in the drawing, and the wider tooth 7b will approach the projection 17e. When the last exposure has been made, and the number of teeth 7a correspond to the number of frames to be exposed on the film, the wider tooth 7b will be situated next to the projection 17e, and since this tooth 7b has a width which is wider than the gaps between the teeth 7a, the projection 17e will not be able to enter into the next gap but instead will engage the outer end of the tooth 7b, so that in this way the gear 7 operates to maintain the member 17 displaced outwardly at a position where the projections 17e and 17d cannot return to the positions indicated in the drawing. Thus, when the operator now turns the gear 5 in order to advance the film, the projection 17e remains in engagement with the outer end of the tooth 7b and the gear 7 will not be turned further. Thus, the exposure counting means remains in the position indicating the last number of the scale 9. The extent to which the tooth 7b extends beyond the remaining teeth 7a is great enough so that the projection 17b also remains outwardly beyond the range of the shoulders 6a and 6b of the cam 6, so that neither of these shoulders can now engage the member 17 to displace it to the left back to the position shown in the drawing, and as a result the edge 17c remains beneath the lateral projection 18b and the operator cannot actuate the shutter release means 18 after the last exposure has been made. In contrast, however, it is now possible to actuate the lever which turns the film transporting means 5, 4 as many times as desired until the film remaining on the film strip after the last exposure has been fully introduced into the film cartridge which receives the exposed film. The lever 14 of course cooperates with the gear 5 to prevent the latter from turning in a clockwise direction, as viewed in the drawing, and thus with this construction it is possible for the film to move only in one direction from a supply spool to a take-up spool, and these spools are situated in suitable cartridges so that the entire film can be displaced into the cartridge for the exposed film. Of course, it is possible, if desired, to rewind the film into the supply spool cartridge after the last exposure, but in this case it would be necessary to provide a structure which would displace the lever 14 in a clockwise direction beyond the position thereof shown in the drawing so that the gear 5 would turn in a clockwise direction.

Assuming now that the film has been fully transported into the cartridge in which the exposed film is received, the operator will open the rear door 13, which forms the rear wall of the camera housing, so that now the spring 12 can turn the lever 11 in a counterclockwise direction, and not only does the tooth 11b of the holding pawl 11 move out of the space between the teeth of the gear 7, but in addition the holding pawl 11 engages at its front edge a pin 17f carried by the movable means 17 so that at this time the holding pawl 11 also cooperates with the movable means 17 to maintain the latter in its position where the control projections 17d and 17e are respectively displaced beyond the cam 6 and gear 7. Therefore, since the tooth 11b of the holding pawl is displaced beyond the gear 7 and the projection 17e is maintained beyond the gear 7 the spring 10 is now free to zero the exposure counting means turning the gear 7 and the pointer 7c in a blockwise direction until the tooth 7b again engages the pawl tooth 11b and is situated on the left side thereof, as viewed in the drawing. Of course, when the door 13 is opened the spring 12 turns the pawl 11 in a counterclockwise direction, as pointed out above, and the extent to which the tooth 7b extends beyond the teeth 7a is such that while the tip of the pawl tooth 11b is situated beyond the teeth 7a it is not situated beyond the tooth 7b, so that during the clockwise turning of the gear 7 the teeth 7a thereof can move past the pawl 11b but the tooth 7b will engage the pawl tooth 11b.

The exposed film can be removed and a supply of unexposed film can now be placed in the camera, and then the door 13 is again closed so that the pawl 11 returns to the position shown in the drawing. Of course, the zeroing of the counter gear 7 has resulted in displacement of the tooth 7b away from the tip of the projection 17e. The open camera door 13 permits the spring 12 to maintain the pawl 11 and the member 17, by engagement of the pin 17f with the pawl 11, in a position where the teeth 7a can turn past the projection 17e until the wider tooth 7b engages the tooth 11b in the manner described above. When the camera door is closed not only does the lever 11 return to the illustrated position, but in addition the projection 17e enters into a space between a pair of teeth 7a and the projection 17d engages a camming edge 6c, so that when the film is advanced to situate the first film frame in a position to be exposed the member 17 will be displaced to the left to the position shown in the drawing releasing the shutter operating means 18 for operation and in addition locating all of the parts again in the position shown in the drawing.

Of course, many variations of the above-described details are possible without departing from the invention. For example, the cam 6 can include three or more camming shoulders. Also, it is possible to provide the scale of exposure numbers on the gear 7 and to provide a stationary index with which the number of exposures cooperates with such a construction. Moreover, it is possible to provide between the gears 5 and 4 additional gears so as to provide a different transmission ratio for the film transporting means. Also, the shutter release 18 can in a known way be used not only for the purpose of controlling the release of the shutter but also for the purpose of controlling a light-responsive structure capable of setting the camera according to the lighting conditions. The gear 5 can, if required, be connected to a shutter cocking structure.

It will be understood that each of the elements described above, or two or more together, may also find a useful application in other types of cameras differing from the types described above.

While the invention has been illustrated and described as embodied in double exposure preventing devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear, said one tooth of said gear extending outwardly beyond the remaining teeth thereof by a distance which is great enough to maintain said one projection of said movable means beyond said cam of said film transporting means when the other of said projections of said movable means engages the outer end of said one tooth.

2. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear, the teeth of said gear being separated from each other by a plurality of gaps of uniform width, and said one tooth having a width which is greater than said uniform width.

3. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear by a distance which is great enough to maintain said one projection of said movable means beyond said cam of said film transporting means when the other of said projections of said movable means engages the outer end of said one tooth, the number of said remaining teeth of said gear being equal to the number of frames to be exposed.

4. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear, said projections of said movable means respectively engaging said cam of said film transporting means and extending between teeth of said gear of said exposure counting means, and the turning of said cam in connection with transportation of film displacing said movable means from a position where said movable means prevents actuation of said shutter release means.

5. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure to as to count each exposure, and said gear having one tooth which is wider than and projects outwardly beyond all of the remaining teeth of said gear, said cam having at least one shoulder and a camming edge extending therefrom and said shutter release means having a camming portion which, when said shutter release means is actuated to make an exposure, cams said movable means in a direction displacing said projections thereof away from said rotary cam of said film transporting means and away from said gear of said exposure counting means, and spring means acting on said movable means for displacing the latter, when said projections are displaced away from said rotary cam and gear, in a direction placing said one projection in engagement with said camming edge of said rotary cam.

6. In a camera, in combination, shutter release means for releasing a shutter of the camera to make an exposure counting means for counting the number of exposures; film transporting means for transporting film in the camera; movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transporting of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the the teeth of said gear for turning the latter after each exposure so as to count each exposure, and said gear having one tooth which is wider than and projects outwardly beyond all of the remaining teeth of said gear; and spring means acting on said gear for returning the latter to an initial position where said exposure counting means is zeroed.

7. In a camera, in combination, shutter release means for releasing a shutter of the camera to make an exposure; exposure counting means for counting the number of exposures; film transporting means for transporting film in the camera; movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear; spring means acting on said gear for returning the latter to an initial position where said exposure counting means is zeroed; a camera door for closing and opening the camera; a holding pawl cooperating with said gear for preventing return thereof to said initial position by said spring means; and second spring means acting on said pawl to turn the latter to a position releasing said gear for return to said initial position by said first-mentioned spring means when said door is displaced to a position opening the camera.

8. In a camera, in combination, shutter release means for releasing a shutter of the camera to make an exposure; exposure counting means for counting the number of exposures; film transporting means for transporting film in the camera; movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear; spring means acting on said gear for returning the latter to an initial position where said exposure counting means is zeroed; a camera door for closing and opening the camera; a holding pawl cooperating with said gear for preventing return thereof to said initial position by said spring means; and second spring means acting on said pawl to turn the latter to a position releasing said gear for return to said initial position by said first-mentioned spring means when said door is displaced to a position opening the camera, said holding pawl when displaced to said position releasing said gear, upon opening of said camera door, also engaging said movable means and maintaining the latter in a position where said projections thereof remain beyond and out of engagement with said rotary cam and gear.

9. In a camera, in combination, shutter release means for releasing a shutter of the camera to make an exposure; exposure counting means for counting the number of exposures; film transporting means for transporting film in the camera; and movable means cooperating with said shutter release means for preventing the latter from making a second exposure until after the film transporting means has transported the film, cooperating with said exposure counting means for advancing the latter by an increment which counts a single additional exposure after said shutter release means is actuated to make an exposure, and cooperating with said film transporting means for limiting the latter to transportation of a single film frame after an exposure has been made with said shutter release means, said film transporting means including a rotary cam, said exposure counting means including a rotary gear having a plurality of gear teeth, and said movable means having a pair of projections one of which cooperates with said cam to limit turning thereof for preventing said film transporting means from transporting the film by a distance equal to more than one film frame, and the other of said projections entering between the teeth of said gear for turning the latter after each exposure so as to count each exposure, and said gear having one tooth which is wider than and projects outwardly beyond all of the remaining teeth of said gear, said gear and cam being coaxial.

References Cited by the Examiner

UNITED STATES PATENTS

| | | | |
|---|---|---|---|
| 2,301,956 | 11/1942 | Kuppenbender et al. | 95—31 |
| 2,364,466 | 12/1944 | Nagel | 95—31 |
| 2,868,099 | 1/1959 | Weiss | 95—31 |

FOREIGN PATENTS

| | | |
|---|---|---|
| 1,031,424 | 6/1953 | France. |
| 727,437 | 3/1955 | Great Britain. |
| 750,077 | 6/1956 | Great Britain. |

NORTON ANSHER, *Primary Examiner.*

VANCE A. SMITH, *Assistant Examiner.*